United States Patent [19]

Komatsu et al.

[11] Patent Number: 4,831,100

[45] Date of Patent: May 16, 1989

[54] HALOGENATED COPOLY CARBONATE END CAPPED WITH PENTAHALAPHENOXY GROUP

[75] Inventors: Takashi Komatsu; Eiichi Terada, both of Ichihara, Japan

[73] Assignee: Idemitsu Petrochemical Co., Ltd., Tokyo, Japan

[21] Appl. No.: 203,238

[22] Filed: Jun. 6, 1988

[30] Foreign Application Priority Data

Jun. 25, 1987 [JP] Japan ................ 62-156489

[51] Int. Cl.$^4$ .................................... C08G 63/62
[52] U.S. Cl. .................. 528/198; 528/196; 528/202; 528/204
[58] Field of Search ............... 528/198, 196, 202, 204

[56] References Cited

U.S. PATENT DOCUMENTS 3,207,777  9/1965  Szobel ..................... 528/199
3,751,480  8/1973  Crennan et al. ............ 528/198

*Primary Examiner*—Harold D. Anderson
*Attorney, Agent, or Firm*—Frishauf, Holtz, Goodman & Woodward

[57] ABSTRACT

Polycarbonate having a repeating unit (I) represented by the general formula:

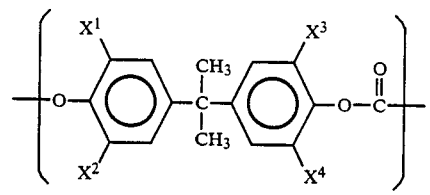

and a repeating unit (II) represented by the formula:

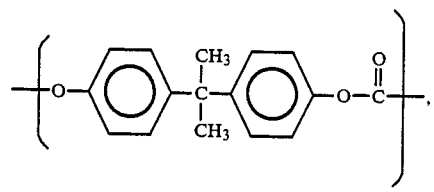

a pentahalogenophenoxy group as bonded at the terminal thereof, and a halogen atom content of 3 to 20% by weight.

10 Claims, 4 Drawing Sheets

HALOGENATED COPOLY CARBONATE END CAPPED WITH PENTAHALAPHENOXY GROUP

BACKGROUND OF THE INVENTION

1. Field of the Invention

The present invention relates to novel polycarbonate and more particularly to polycarbonate which is excellent in transparency and also in flame retardance and impact resistance.

2. Description of Related Art

As polycarbonate having high flame retardance, for example, polycarbonate having a halogen-substituted phenoxy group (e.g., a pentabromophenoxy group, a tetrachlorophenoxy group,, a tribromophenoxy group and the like) at the terminal thereof (Japanese Patent Publication No. 40715/1971), a copolymer of tetrahalogenobisphenolsulfone and bisphenol A (BPA) (Japanese Patent Application Laid-Open No. 123204/1976), polycarbonate having an aromatic monosulfonyl group at the terminal thereof (Japanese Patent Application Laid-Open No. 21497/1979), a copolymer of tetrabromobisphenol A and BPA (Japanese Patent Application Laid-Open No. 155233/1982), and polycarbonate having a sulfonic acid salt group at the terminal thereof (PCT Japanese Patent Application Laid-Open No. 501212/1985) are known.

These conventional polycarbonates, however, are not sufficiently satisfactory in impact resistance or transparency although it is superior in flame retardance. That is, there has not been obtained polycarbonate which is superior in all of flame retardance, impact resistance, and transparency.

Even polycarbonate which has a small flow value and thus is suitable for extrusion molding, when an effective amount of tetrabromobisphenol A is added in order to impart flame retardance, suffers from a problem that it becomes difficult to pulverize the resulting polycarbonate in the course of production thereof.

In addition, polycarbonate obtained using halogen-containing bisphenol and halogen-containing phenol as starting materials is known (Japanese Patent Application Laid-Open No. 136796/1976). This polycarbonate, however, is not sufficiently high in impact resistance and fluidity although it is produced using three or more different halogen-containing bisphenols as starting materials.

SUMMARY OF THE INVENTION

The object of the present invention is to provide polycarbonate which is superior in all of flame retardance, impact resistance and transparency.

The present invention relates to polycarbonate comprising a repeating unit (I) represented by the general formula:

(wherein $X^1$ to $X^4$ are each a halogen atom) and a repeating unit (II) represented by the formula:

and having a pentabhalogenophenoxy group represented by the general formula:

(wherein $X^5$ to $X^9$ are each a halogen atom) as bonded to the terminal thereof, and a halogen atom content of 3 to 20% by weight.

DESCRIPTION OF PREFERRED EMBODIMENTS

The polycarbonate of the present invention, as described above, has a repeating unit (I) represented by the general formula (A) and a repeating unit (II) represented by the formula (B). In the general formula (A), $X^1$ to $X_4$ are each a halogen atom, such as a bromine atom, a chlorine atom and a fluorine atom. $X^1$ to $X^4$ may be the same or different and usually are the same.

In the polycarbonate of the present invention, the pentahalogenophenoxy group represented by the general formula(C) is bonded at the terminal of the molecule, particularly at both terminals thereof. In the general formula (C), $X^5$ to $X^9$ are each a halogen atom, such as a bromine atom, a chlorine atom and a fluorine atom, like in the case of $X^1$ to $X^4$.

$X^1$ to $X^4$ contained in the repeating unit (I) represented by the general formula (A) may be the same as or different from $X^5$ to $X^9$ contained in the general formula (C).

The molar ratio of the repeating unit (I) to the repeating unit (II) in the polycarbonate of the present invention is not critical. The molar ratio is determined so that the halogen atom content of polycarbonate is within the range of 3 to 20% by weight, preferably 5 to 10% by weight.

The halogen atom content of polycarbonate means a ratio of the total amount of halogen atoms contained in the repeating unit (I) and also in the pentahalogenophenoxy group at the terminal to the total weight of the polycarbonate.

If the halogen atom content of polycarbonate is less than 3% by weight, flame retardance is poor. On the other hand, if it is more than 20% by weight, impact resistance is insufficiently low.

The ratio of the amount of halogen atoms contained in the repeating unit (I) to the amount of halogen atoms contained in the pentahalogenophenoxy group is not critical, and it suffices that the total amount of halogen atoms is within the above specified range. Usually the proportion of halogen atoms contained in the repeating unit (I) is 1 to 7% by weight based on the weight of polycarbonate, and the proportion of halogen atoms contained in the pentahalogenophenoxy group is 1 to 8% by weight based on the weight of polycarbonate.

The degree of polymerization of the polycarbonate of the present invention is not critical, and the viscosity average molecular weight is preferably at least 10,000 and particularly preferably in the range of 15,000 to 25,000. If the viscosity average molecular weight is too small, mechanical strength such as impact resistance and the like is not sufficiently high.

The polycarbonate of the present invention has the above repeating units (I) and (II), and the pentahalogenophenoxy group of the general formula (C) as bonded at the terminal thereof, and it may be a random copolymer, a block copolymer, an alternate copolymer or the like.

The polycarbonate of the present invention may contain a small amount of repeating units other than the repeating units (I) and (II) in the polymer chain thereof.

The polycarbonate of the present invention can be divided into two groups depending on the purpose of use. One is polycarbonate suitable for extrusion molding. In addition to the aforementioned requirements, this polycarbonate is necessary to meet the requirement that the flow value is not more than $5 \times 10^{-2}$ milliliter (mL)/sec. If the flow value is more than $5 \times 10^{-2}$ mL/sec, the resulting polycarbonate is unsuitable for extrusion molding.

The other is polycarbonate suitable for injection molding. In addition to the aforementioned requirements, this polycarbonate is necessary to meet the requirements that the viscosity average molecular weight is at least 10,000, preferably 15,000 to 25,000 and the flow value is at least $5 \times 10^{-2}$ mL/sec. Particularly preferred is polycarbonate having a halogen atom content of 5 to 10% by weight. If the viscosity average molecular weight is too small, the resulting polycarbonate fails to provide a molding having high impact resistance. On the other hand, if the flow value is less than $5 \times 10^{-2}$ mL/sec, the resulting polycarbonate is unsuitable for injection molding.

The polycarbonate of the present invention can be produced by various methods. More specifically, the following two methods are preferably employed.

In accordance with the first method, an aqueous alkali solution (e.g., an aqueous sodium hydroxide solution, an aqueous potassium hydroxide solution, an aqueous sodium carbonate solution and the like) of tetrahalogenobisphenol A (e.g., tetrabromobisphenol A, tetrachlorobisphenol A, tetrafluorobisphenol A and the like) as represented by the general formula:

(wherein $X^1$ to $X^4$ are the same as described above), an aqueous alkali solution of bisphenol A (BPA) represented by the formula:

an aqueous alkali solution of pentahalogenophenol (e.g., pentabromophenol, pentachlorophenol, pentafluorophenol and the like) as represented by the general formula:

(wherein $X^5$ to $X^9$ are the same as described above), a solvent (e.g., methylene chloride, chlorobenzene, pyridine, chloroform, carbon tetrachloride and the like, and a catalyst (e.g., triethylamine, trimethylbenzylammonium chloride and the like) are mixed in a predetermined ratio, and phosgene is blown into the resulting mixture to cause interfacial polycondensation. Since the reaction is exothermic, it is preferred to cool the reaction system with water or ice. As the reaction proceeds, the reaction system becomes acidic and thus it is preferred that the pH be maintained at 10 or more by adding an alkali while measuring with a pH meter.

In the above polycondensation reaction, tetrahalogenobisphenol A of the general formula (A') constitutes the repeating unit (I) of the resulting polycarbonate, and bisphenol A of the formula (B') constitutes the repeating unit (II). Thus the ratio of the amount of tetrahalogenobisphenol A charged to the amount of bisphenol A charged is determined appropriately depending on the molar ratio of the repeating unit (I) to the repeating unit (II) of polycarbonate to be produced, or the halogen atom content thereof. On the other hand, the amounts of pentahalogenophenol and phosgene introduced specify the degree of polymerization of each of the repeating units (I) and (II), and further the degree of polymerization of the whole polycarbonate, that is, the molecular weight thereof. Thus the above amounts are determined appropriately taking into consideration the above factors. In blowing phosgene, the amount of phosgene blown per hour is controlled so that the total amount of phosgene blown until the reaction is completed is equal to the feeding amount necessary for the reaction.

On pouring the reaction mixture thus obtained into a large amount of a precipitating agent, e.g., methanol, the polycarbonate of the present invention is precipitated.

In the above reaction, in place of phosgene, various carbonate-forming derivatives such as bromophosgene, diphenyl carbonate, di-p-tolyl carbonate, phenyl-p-tolyl carbonate, di-p-chlorophenyl carbonate, dinaphthyl carbonate and the like can be used.

In accordance with the second method, a polycarbonate oligomer is previously formed from bisphenol A and phosgene, an aqueous alkali solution of tetrahalogenophenol A, an aqueous alkali solution of pentahalogenophenol, a solvent capable of dissolving the above oligomer (e.g., methylene chloride) and a catalyst (e.g., triethylamine, trimethylbenzylammonium chloride and the like) are mixed with the above oligomer in a predetermined ratio and stirred to perform preliminary polymerization, and subsequently an aqueous alkali solution of bisphenol A and if desired, p-tertbutylphenol and the like are added to proceed the polycondensation reaction. On pouring the reaction mixture in a large amount of a precipitating agent (e.g., methanol and the like), the polycarbonate of the present invention is precipitated.

The polycarbonate of the present invention can be produced efficiently by the aforementioned methods. It is also effective to employ the following other methods: (1) a method in which a polycarbonate oligomer is previously synthesized from tetrahalogenobisphenol A and phosgene, and this oligomer, bisphenol A and pentahalogenophenol are reacted in the presence of a suitable solvent, a suitable aqueous alkali solution, a suitable catalyst and the like; (2) a method in which tetrahalogenobisphenol A (or bisphenol A), pentahalogenophenol and a polycarbonate oligomer prepared from bisphenol A (or tetrahalogenobisphenol A) add phosgene are reacted in the presence of a suitable solvent, a suitable aqueous alkali solution, a suitable catalyst and the like, and during this reaction, phosgene is blown; (3) a method in which an oligomer is formed from tetrahalogenobisphenol A and phosgene simultaneously with the formation of an oligomer from bisphenol A and phosgene, and these two types of oligomers are reacted in the presence of a suitable solvent, a suitable aqueous alkali solution, a suitable catalyst and the like; and (4) a multi-stage polymerization method in which in the aforementioned methods, polymerization is carried out at two or more stages.

The polycarbonate of the present invention can be obtained by any of the above methods.

In production of the aforementioned polycarbonate suitable for extrusion molding among the polycarbonate of the present invention, the flow value can be controlled to not more than $5 \times 10^{-2}$ mL/sec mainly by controlling the amount of pentahalogenophenol to be used as a molecular weight modifier. More specifically, it suffices that the pentahalogenophenol be used in an amount of not more than 5 mol %, preferably not more than 4 mol % based on the total amount of the phenols (e.g., tetrahalogenobisphenol A, bisphenol A and pentahalogenophenol) to be used.

Polycarbonate suitable for injection molding has, as described above, a viscosity average molecular weight of at least 10,000 and a flow value of not less than $5 \times 10^{-2}$ mL/sec. The viscosity average molecular weight and the flow value can be controlled within the above specified ranges mainly by controlling the amount of pentahalogenophenol to be used as a molecular weight modifier.

As described above, the polycarbonate of the present invention is superior in flame retardance and has sufficiently high impact resistance, and further is superior in transparency. More specifically, the polycarbonate of the present invention has such flame retardance that UL-94 (Underwriter's Laboratories Subject 94) using a test piece of 1/16 inch (thickness) is V-0. Polycarbonate of the grade that is suitable for extrusion molding has a flow value of not more than $5 \times 10^{-2}$ mL/sec and thus can be easily pulverized. Polycarbonate of the grade that is suitable for injection molding has such impact resistance that the Izod impact strength (notched, ductile failure at ordinary temperature) is not less than 50 kg.cm/cm, and further has such high fluidity as to permit molding in a thick film form.

Accordingly the polycarbonate of the present invention can be widely used in production of various industrial products, particularly extrusion molding materials and injection molding materials, for example, home electric appliances, office automation (OA) apparatuses, construction materials, sheets and the like.

The present invention is described in greater detail with reference to the following examples.

PREPARATION EXAMPLE

Preparation of Polycarbonate Oligomer of Bisphenol A 91 g of bisphenol A (BPA), 330 mL of methylene chloride, and 560 mL of a 2.0 normal (N) aqueous sodium hydroxide solution were placed in a 2-liter flask equipped with a stirrer, and then phosgene was blown thereinto for 70 minutes while stirring and cooling on a water bath. On allowing the resulting reaction mixture to stand at room temperature, a methylene chloride solution of oligomer was formed as a lower layer. The concentration of oligomer in the oligomer solution was 320 g/liter, and the number average molecular weight was 850 and the chloro-formate concentration was 0.7 mol/liter.

EXAMPLE 1

8 liters (L) of the polycarbonate oligomer obtained in Preparation Example, 600 mL of an aqueous sodium hydroxide solution of tetrabromobisphenol A (TBA) (tetrabromobisphenol A 99.3 g (0.187 mol), sodium hydroxide 21.9 g, water 500 mL), and 4.4 g (0.043 mol) of triethylamine were placed in a 50-liter container equipped with a stirrer, and then stirred at 500 rpm. After 10 minutes, an aqueous sodium hydroxide solution of pentabromophenol (PBP) (pentabromophenol 184 g, 0.377 mol), sodium hydroxide 30.1 g, water 10.3 L) is added to the reaction system, and the resulting mixture was stirred. After 50 minutes, 4.2 L of an aqueous sodium hydroxide solution of bisphenol A (bisphenol A 439 g (1.93 mol), sodium hydroxide 289 g, water 3.7 L), 11.9 g of p-tert-butylphenol, and 6 L of methylene chloride were added, and the resulting mixture was stirred.

After stirring for 60 minutes, the resulting reaction mixture was separated into an aqueous layer and a methylene chloride layer containing the copolymer forced.

The methylene chloride layer was washed with water, and acid (0.1N hydrochloric acid), and water in this order. Upon removal of the methylene chloride from the methylene chloride layer at 40° C. under reduced pressure, a white powder (copolymer) was obtained. This powder was dried at 120° C for one day and night, and melted and pelletized by the use of an extruder. The glass transition temperature (Tg) of the pellet was 154.1° C. The viscosity average molecular weight was 18,400, and the molecular weight distribution as determined by gel permeation chromatography was such a distribution that had a single peak at the above value.

The pellets were injection molded at a temperature of 280° C. and an injection pressure of 56 kg/cm$^2$ by the use of an injection molding machine to produce a test piece. This test piece was measured for Izod impact resistance and flame retardance, and its transparency was measured with the eye. The flow value of the pellet was measured with a flow tester.

Figure 1:
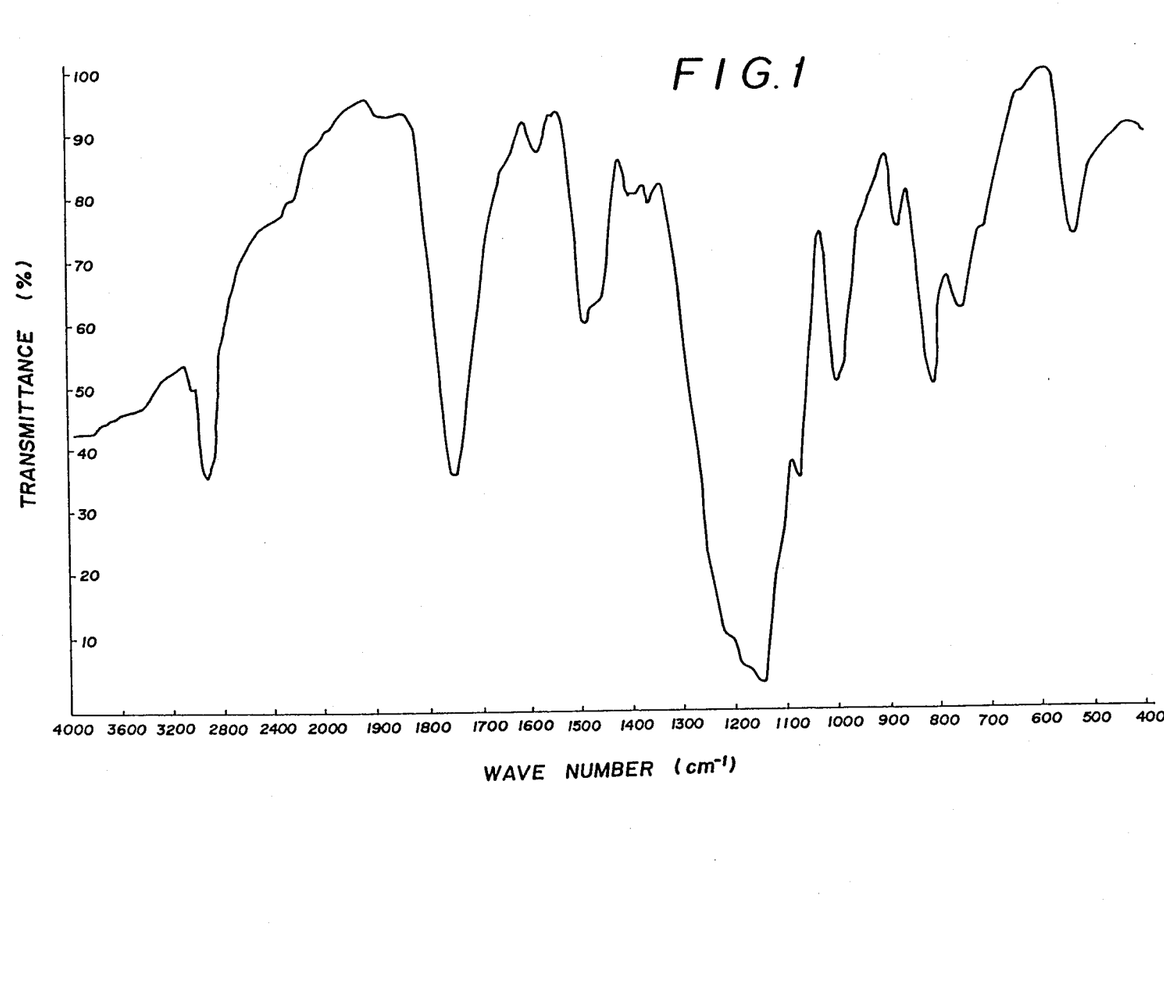
FIG. 1 is an infrared absorption (IR) spectrum by the KBr tablet method of the copolymer obtained in Example 1.
Figure 2:
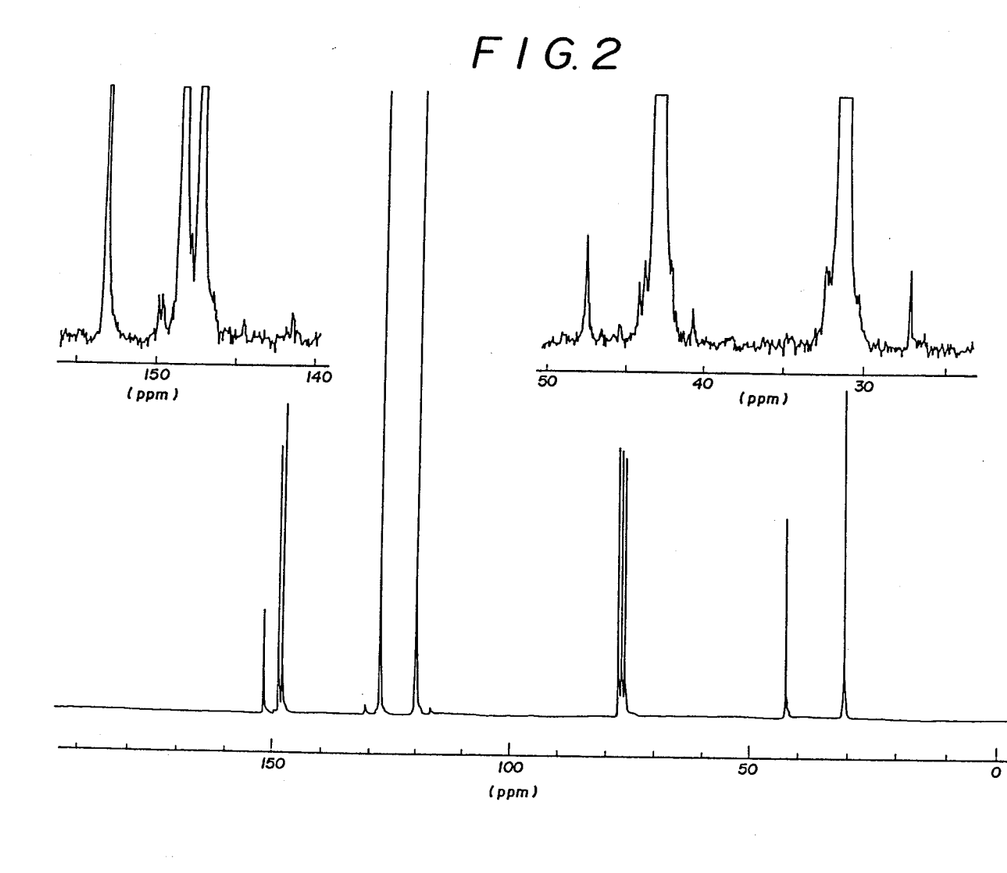
FIG. 2 is an nuclear magnetic resonance (NMR) spectrum of the copolymer obtained in Example 1.

The bromine content of the pellet was 6.8% by weight. The bromine content was measured, after alkali decomposition, by the Volhard method. The results are shown in Table 2 An infrared absorption (IR) spectrum by the KBr tablet method and a nuclear magnetic resonance (NMR) spectrum (solvent, CDCl$_3$) of the above copolymer are shown in FIGS. 1 and 2, respectively.

EXAMPLES 2 TO 6 AND OOMPARATIVE EXAMPLES 1 TO 3

The procedure of Example 1 was repeated wherein the amounts of the aqueous sodium hydroxide solution of tetrabromobisphenol A (TA), the aqueous sodium hydroxide solution of pentabromophenol (PBP) and the p-tert-butylphenol were changed as shown in Table 1. The results are shown in Table 2.

The viscosity average molecular weight (Mv) was determined by calculating form a viscosity of a methylene chloride solution as measured at 20? C. by the use of a Ubbellohde viscometer. *3 The flow value was measured according to JIS-K-7210 (load 160 kg/cm$^2$). *4 The Izod impact value was determined according to JIS-K-7110 using a test piece having a thickness of 8 inch. 5 Flame retardance was measured according to UL-94 Underwriter's Laboratories Subject 94) using test piece of 1/16 inch in thickness

EXAMPLE 7

10L of the polycarbonate oligomer prepared in Preparation Example, 2 L of an aqueous sodium hydroxide solution of tetrabromobisphenol A (TBA) and pentabromophenol (PBP) (TBA 333 g (0.61 mol), PBP 240 g (0.49 mol), sodium hydroxide 95.6 g, water 1.4 L) and 2.0 mL (0.014 mol) of triethylamine were placed in a 5-liter container equipped with a stirrer, and stirred at 500 rpm. After 60 minutes, 4.1L of an aqueous sodium hydroxide solution of BPA (BPA 488 g (2.14 mol), sodium hydroxide 285 g, water 3.6L) and 6L of methylene chloride were added and the resulting mixture was stirred.

After 60 minutes, the reaction product was washed with water, an acid (0.1N hydrochloric acid) and water in this order. The methylene chloride was distilled

TABLE 1

| | Aqueous Tetrabromobisphenol A Solution | | | Aqueous Pentabromophenol Solution | | | p-tert-Butyl phenol (g) |
|---|---|---|---|---|---|---|---|
| | TBA (g) | NaOH (g) | Water (mL) | PBP (g) | NaOH (g) | Water (mL) | |
| Example 1 | 99.3 | 21.9 | 500 | 184 | 30.1 | 1030 | 11.9 |
| Example 2 | 52.5 | 11.6 | 260 | 222 | 36.4 | 1250 | 0 |
| Example 3 | 51.4 | 11.3 | 260 | 160 | 26.6 | 910 | 18.5 |
| Example 4 | 84.7 | 18.7 | 430 | 232 | 38.0 | 1300 | 0 |
| Example 5 | 262 | 57.8 | 1320 | 40.6 | 6.6 | 230 | 56.2 |
| Example 6 | 145 | 31.9 | 730 | 231 | 37.8 | 1290 | 0 |
| Comparative Example 1 | 276 | 60.9 | 1390 | 0 | 0 | 0 | 34.1 |
| Comparative Example 2 | 345 | 76.1 | 1740 | 0 | 0 | 0 | 58.1 |
| Comparative Example 3 | 415 | 91.5 | 2090 | 0 | 0 | 0 | 58.1 |

TABLE 2

| | Bromine Atom Content (wt %)*1 | Bromine Composition Ratio TBA/PBP*1 (wt %/wt %) | Viscosity Average Molecular Weight*2 | Glass Transition Temperature (°C.) | Flow Value*3 (mL/s) | Izod Impact Value*4 (notched) (kg · cm/cm) | Flame Retardance*5 | Transparency |
|---|---|---|---|---|---|---|---|---|
| Example 1 | 6.8 | 1.9/4.9 | 18,400 | 154.1 | 6.5 × 10$^{-2}$ | 75 | V-0 | Transparent |
| Example 2 | 6.9 | 1.0/5.9 | 17,700 | 153.8 | 8.0 × 10$^{-2}$ | 74 | V-0 | Transparent |
| Example 3 | 5.4 | 1.0/4.4 | 19,800 | 155.0 | 6.1 × 10$^{-2}$ | 72 | V-0 | Transparent |
| Example 4 | 7.7 | 1.6/6.1 | 17,900 | 154.2 | 7.2 × 10$^{-2}$ | 62 | V-0 | Transparent |
| Example 5 | 6.2 | 5.1/1.1 | 20,300 | 153.8 | 7.9 × 10$^{-2}$ | 79 | V-0 | Transparent |
| Example 6 | 8.7 | 2.7/6.0 | 18,100 | 156.1 | 6.8 × 10$^{-2}$ | 52 | V-0 | Transparent |
| Comparative Example 1 | 5.2 | 5.2/0 | 27,200 | 160.2 | 1.5 × 10$^{-2}$ | 100 | V-2 | Transparent |
| Comparative Example 2 | 6.6 | 6.6/0 | 19,200 | 157.3 | 7.5 × 10$^{-2}$ | 11 | V-0 | Transparent |
| Comparative Example 3 | 7.5 | 7.5/0 | 18,500 | 157.5 | 8.0 × 10$^{-2}$ | 12 | V-0 | Transparent |

*1 The bromine content of the polycarbonate, resulting from TBA and PBP, was determined by calculation. The bromine content of the polymer was determined, after alkali decomposition, by the Volhard method.
*2 The viscosity average molecular weight (Mv) was determined by calculating from a viscosity of a methylene chloride solution as measured at 20° C. by the use of a Ubbellohde viscometer.
*3 The flow value was measured according to JIS-K-7210 (load 160 kg/cm$^2$).
*4 The Izod impact value was determined according to JIS-K-7110 using a test piece having a thickness of ⅛ inch.
*5 Flame retardance was measured according to UL-94 (Underwriter's Laboratories Subject 94) using test piece of 1/16 inch in thickness.

*1 The bromine content of the polycarbonate, resulting from TBA and PBP, was determined by calculation. The bromine content of the polymer was determined, after alkali decomposition, by the Volhard method. *2 away under reduced pressure at 40° C. to obtain a white powder (copolymer). The powder was dried at 120° C.

for one day and night, and melted and pelletized with an extruder. The glass transition temperature (Tg) of the pellet was 153.3° C. The viscosity average molecular weight was 19,900, and the molecular weight distribution as determined by gel permeation chromatography had a single peak at the above value.

Figure 3:
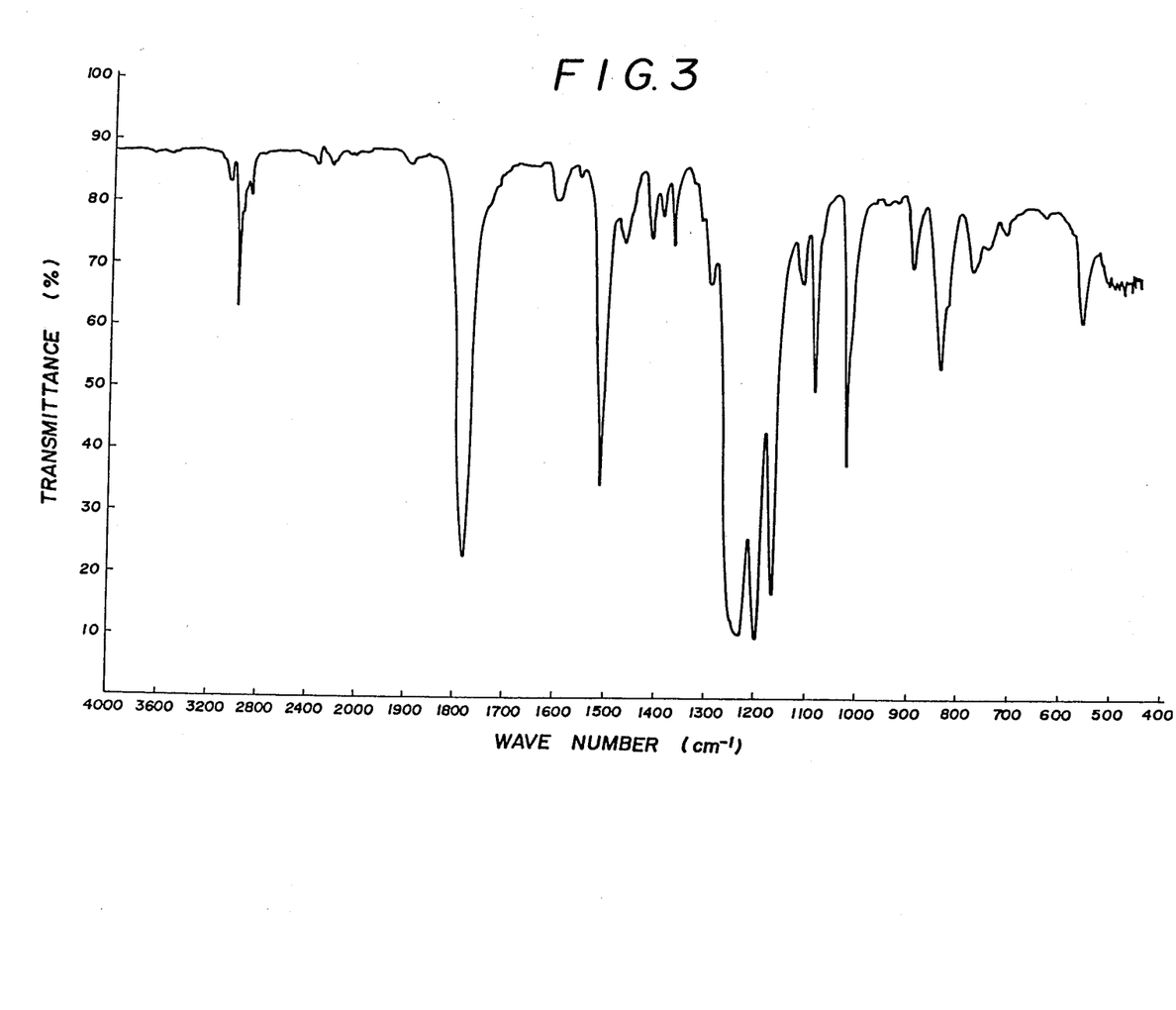
FIG. 3 is an infrared absorption (IR) spectrum by the deposition thin film method of the copolymer obtained in Example 7.
Figure 4:
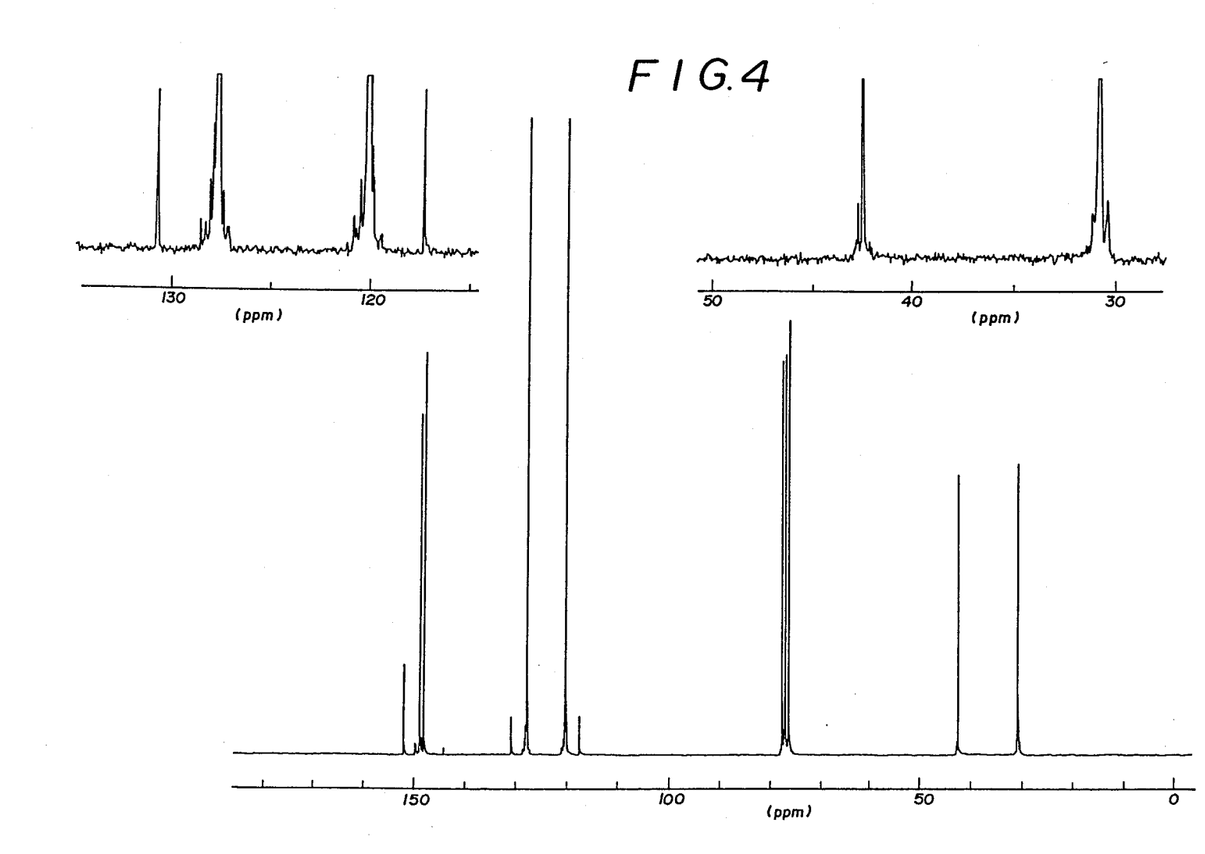
FIG. 4 is a nuclear magnetic resonance (NMR) spectrum (solvent: CDCl$_3$) of the copolymer obtained in Example 7.

The bromine content of the pellet was 10.4% by weight. The bromine content was measured, after alkali decomposition, by the Volhard method. The results are shown in Table 4. An infrared absorption (IR) spectrum by the deposition thin film method of the above copolymer is shown in FIG. 3, and a nuclear magnetic resonance (NMR) spectrum (solvent, $CDCl_3$) is shown in FIG. 4.

TABLE 3-continued

| | Aqueous Sodium Hydroxide Solution | | | | |
|---|---|---|---|---|---|
| | TBA (g) | PBP (g) | PTBP (g) | NaOH (g) | Water (L) |
| Example 11 | 196 | 140 | 40.0 | 77.4 | 1.4 |
| Comparative Example 4 | 650 | 0 | 73.6 | 149 | 2.0 |
| Comparative Example 5 | 520 | 0 | 57.4 | 119 | 1.8 |
| Comparative Example 6 | 780 | 0 | 73.6 | 171 | 2.2 |
| Comparative Example 7 | 390 | 0 | 82.9 | 110 | 1.6 |

TABLE 4

| | Bromine Atom Content*1 (wt %) | Bromine Composition Ratio*1 (wt %/wt %) | Viscosity Average Molecular Weight*2 | Flow Value*3 (mL/sec) | Izod Impact Strength*4 (notched) (kg·cm/cm) | Flame Retardance*5 |
|---|---|---|---|---|---|---|
| Example 7 | 10.4 | 5/5 | 19,900 | $3.6 \times 10^{-2}$ | 33 | V-0 |
| Example 8 | 8.3 | 4/4 | 24,800 | $2.1 \times 10^{-2}$ | 56 | V-0 |
| Example 9 | 8.1 | 3/5 | 20,800 | $3.6 \times 10^{-2}$ | 85 | V-0 |
| Example 10 | 12.3 | 7/5 | 19,800 | $3.2 \times 10^{-2}$ | 23 | V-0 |
| Example 11 | 6.2 | 3/3 | 23,500 | $4.5 \times 10^{-2}$ | 91 | V-0 |
| Comparative Example 4 | 10.3 | 10/0 | 18,800 | $3.7 \times 10^{-2}$ | 10 | V-0 |
| Comparative Example 5 | 8.2 | 8/0 | 22,000 | $2.2 \times 10^{-2}$ | 11 | V-0 |
| Comparative Example 6 | 12.2 | 12/0 | 18,300 | $3.3 \times 10^{-2}$ | 9.2 | V-0 |
| Comparative Example 7 | 6.3 | 6/0 | 23,100 | $4.6 \times 10^{-2}$ | 75 | V-0 |

*1 to *5: Same as in Table 2.

FIG. 4.

EXAMPLES 8 TO 11, AND COMPARATIVE EXAMPLES 4 TO 7

The procedure of Example 7 was repeated wherein the aqueous sodium hydroxide solution of TBA and PBP was replaced by predetermined amounts of the aqueous sodium hydroxide solution of TBA and PBP or the aqueous alkali solution of TBA, PBP and p-tert-butylphenol (PTBP) as shown in Table 3. The results are shown in Table 3.

EXAMPLE 12

2L of a methylene chloride solution (concentration 20%) of the polycarbonate prepared in Example 7 was placed in a stirring machine equipped with a vacuum pump, and the methylene chloride solution was removed at 40° C. and -200 mmHg. After about one hour, a white powder was obtained.

COMPARATIVE EXAMPLE 8

The procedure of Example 12 was repeated wherein 2L of a methylene chloride solution (concentration 20%) of the polycarbonate prepared in Comparative Example 4 was used. After about 40 minutes, the above methylene chloride solution of the polycarbonate became viscous and the torque increased and, therefore, the stirring machine stopped. Eventually a powder could not be obtained.

TABLE 3

| | Aqueous Sodium Hydroxide Solution | | | | |
|---|---|---|---|---|---|
| | TBA (g) | PBP (g) | PTBP (g) | NaOH (g) | Water (L) |
| Example 7 | 333 | 240 | 0 | 95.6 | 1.4 |
| Example 8 | 260 | 187 | 0 | 74.6 | 1.4 |
| Example 9 | 196 | 235 | 0 | 71.6 | 1.4 |
| Example 10 | 455 | 240 | 0 | 193 | 1.8 |

What is claimed is:

1. Polycarbonate having a repeating unit (1) represented by the general formula:

wherein $X^1$ to $X^4$ are each a halogen atom, and a repeating unit (II) represented by the formula:

and a pentahalogenophenoxy group represented by the general formula:

wherein $X^5$ to $X^9$ are each a hologen atom bonded at a terminal thereof, and said polycarbonate a halogen atom content of 3 to 20% by weight.

2. The polycarbonate as claimed in claim 1, having a flow value of not more than $5 \times 10^{-2}$ mL/sec 3. The polycarbonate as claimed in claim 1, having a viscosity average molecular weight of at least 10,000, a halogen atom content of 5 to 10% by weight, and a flow value of at least $5 \times 10^{-2}$ mL/sec.

4. The polycarbonate as claimed in claim 3, having viscosity average molecular weight of from 15,000 to 25,000.

5. The polycarbonate as claimed in claim 4, having a halogen atom content of 5 to 10% by weight, and having said pentahalogenophenoxy group bonded at both terminals of the polycarbonate.

6. The polycarbonate as claimed in claim 2, having a halogen atom content of 5 to 10 % by weight, and having said pentahalogenophenoxy group bonded at both terminals of the polycarbonate and wherein said viscosity average molecular weight is from 15,000 to 25,000.

7. The polycarbonate as claimed in claim 1, wherein all of the halogen atoms are bromine atoms.

8. The polycarbonate as claimed in claim 3, wherein all of the halogen atoms are bromine atoms.

9. The polycarbonate a claimed in claim 4, wherein all of the halogen atoms are bromine atoms.

10. The polycarbonate as claimed in claim 6, wherein all of the halogen atoms are bromine atoms.

* * * * *

UNITED STATES PATENT AND TRADEMARK OFFICE
CERTIFICATE OF CORRECTION

PATENT NO. : 4,831,100

DATED : May 16, 1989

INVENTOR(S) : KOMATSU et al

It is certified that error appears in the above-identified patent and that said Letters Patent is hereby corrected as shown below:

Column 7, line 19, change "OOMPARATIVE" to --COMPARATIVE--.

Column 7, line 65 to line 10 of column 8, are duplicates of the footnotes printed immediately after "TABLE 2".

Column 11, claim 1, line 2, following "polycarbonate", insert --having--.

Signed and Sealed this

Fifth Day of May, 1992

Attest:

DOUGLAS B. COMER

*Attesting Officer*     *Acting Commissioner of Patents and Trademarks*